US012737271B2

(12) United States Patent
Milligan et al.

(10) Patent No.: US 12,737,271 B2
(45) Date of Patent: Sep. 15, 2026

(54) SAFETY COMPLIANCE FOR MAINTENANCE AND OPERATIONS OF CRITICAL SYSTEMS

(71) Applicant: Kyndryl, Inc., New York, NY (US)

(72) Inventors: Robert S. Milligan, Erlanger, KY (US); Amy Forsee, Ashland, MO (US); Deepika Murthy Nath, Cary, NC (US); Kelly Ann Washburn, Naugatuck, CT (US)

(73) Assignee: Kyndryl, Inc., New York, NY (US)

( * ) Notice: Subject to any disclaimer, the term of this patent is extended or adjusted under 35 U.S.C. 154(b) by 76 days.

(21) Appl. No.: 18/899,343

(22) Filed: Sep. 27, 2024

(65) Prior Publication Data

US 2026/0093590 A1 Apr. 2, 2026

(51) Int. Cl.
*G06F 11/00* (2006.01)
*G06F 11/30* (2006.01)
*G06F 11/34* (2006.01)

(52) U.S. Cl.
CPC ...... *G06F 11/3072* (2013.01); *G06F 11/3476* (2013.01)

(58) Field of Classification Search
CPC .................................................. G06F 11/3072
See application file for complete search history.

(56) References Cited

U.S. PATENT DOCUMENTS 5,859,811 A 1/1999 Miller et al.
7,359,810 B2 4/2008 Letts et al.
7,409,320 B2 8/2008 Wegerich
8,365,019 B2 1/2013 Sailer et al.
8,887,286 B2 11/2014 Dupont et al.
10,692,032 B2 6/2020 Datta Ray
11,283,748 B2 3/2022 Snapir et al.
2007/0094195 A1 4/2007 Wang (Continued)

FOREIGN PATENT DOCUMENTS

CN 117896506 4/2024

OTHER PUBLICATIONS

O. Rajabi Shishvan, D.-S. Zois and T. Soyata, "Machine Intelligence in Healthcare and Medical Cyber Physical Systems: A Survey," in IEEE Access, vol. 6, pp. 46419-46494, 2018, doi: 10.1109/ACCESS.2018.2866049 (Year: 2018).*

(Continued)

*Primary Examiner* — Matheus Ribeiro Stivaletti
(74) *Attorney, Agent, or Firm* — Erik Swanson; Andrew D. Wright; Calderon Safran & Wright P.C.

(57) ABSTRACT

A method may include receiving a set of inputs; transforming the set of inputs into a set of corresponding waveforms; generating from the set of corresponding waveforms, a composite wave spectrum, including identifying a waveform sub-set corresponding to a time interval of the composite wave spectrum; determining based on a comparison of the waveform sub-set to a pattern repository, an anomaly exists within the waveform sub-set in response to determining the composite wave spectrum is an operational-type spectrum; analyzing the anomaly to determine an associated risk; logging based on the anomaly and the associated risk, an incident record; determining based on the anomaly, an approved change control exists; and executing the approved change control.

20 Claims, 10 Drawing Sheets

(56) References Cited

U.S. PATENT DOCUMENTS

| | | | | |
|---|---|---|---|---|
| 2009/0043522 | A1 | 2/2009 | Liggiero, III et al. | |
| 2016/0125068 | A1 | 5/2016 | Dongieux | |
| 2016/0327595 | A1* | 11/2016 | Reinders | G06F 1/26 |
| 2019/0050942 | A1 | 2/2019 | Dalal et al. | |
| 2020/0159934 | A1 | 5/2020 | Yamaguchi et al. | |
| 2021/0019211 | A1* | 1/2021 | Sghiouer | G06N 3/09 |
| 2021/0109497 | A1 | 4/2021 | Man et al. | |
| 2023/0153389 | A1* | 5/2023 | Bickel | G06F 18/22<br>702/67 |
| 2023/0195589 | A1 | 6/2023 | Calabria | |
| 2024/0178667 | A1* | 5/2024 | Pankova | H02J 3/0012 |
| 2025/0190564 | A1* | 6/2025 | Hassan | H04L 27/36 |

OTHER PUBLICATIONS

Cheng et al., "Vision-based Monitoring Of Site Safety Compliance Based On Worker Re-identification And Personal Protective Equipment Classification", Automation in Construction, vol. 139. https://www.sciencedirect.com/science/article/pii/S0926580522001856, Jul. 2022; 18 pages.

* cited by examiner

SAFETY COMPLIANCE FOR MAINTENANCE AND OPERATIONS OF CRITICAL SYSTEMS

BACKGROUND

Aspects of the present invention relate generally to systematic pattern and anti-pattern recognition, risk analysis, and compliance validation in computer systems and, more particularly, to auditability, maintenance, and change management within computer systems.

Systems for safety compliance and operations of critical computing systems and components require ongoing monitoring and reporting.

SUMMARY

In a first aspect of the invention, there is a computer-implemented method including: receiving a set of inputs; transforming the set of inputs into a set of corresponding waveforms; generating from the set of corresponding waveforms, a composite wave spectrum, including identifying a waveform sub-set corresponding to a time interval of the composite wave spectrum; determining based on a comparison of the waveform sub-set to a pattern repository, an anomaly exists within the waveform sub-set in response to determining the composite wave spectrum is an operational-type spectrum; analyzing the anomaly to determine an associated risk; logging based on the anomaly and the associated risk, an incident record; determining based on the anomaly, an approved change control exists; and executing the approved change control.

In another aspect of the invention, there is a computer program product including one or more computer readable storage media having program instructions collectively stored on the one or more computer readable storage media. The program instructions are executable to: receive a set of inputs; transform the set of inputs into a set of corresponding waveforms; generate from the set of corresponding waveforms, a composite wave spectrum comprising identifying a waveform sub-set corresponding to a time interval of the composite wave spectrum; determine, based on a comparison of the waveform sub-set to a pattern repository, an anomaly exists within the waveform sub-set in response to determining the composite wave spectrum is an operational-type spectrum; analyze the anomaly to determine an associated risk; log, based on the anomaly and the associated risk, an incident record; determine, based on the anomaly, an approved change control exists; and execute the approved change control.

In another aspect of the invention, there is system including a processor, a computer readable memory, one or more computer readable storage media, and program instructions collectively stored on the one or more computer readable storage media. The program instructions are executable to: receive a set of inputs; transform the set of inputs into a set of corresponding waveforms; generate from the set of corresponding waveforms, a composite wave spectrum comprising identifying a waveform sub-set corresponding to a time interval of the composite wave spectrum; determine, based on a comparison of the waveform sub-set to a pattern repository, an anomaly exists within the waveform sub-set in response to determining the composite wave spectrum is an operational-type spectrum; analyze the anomaly to determine an associated risk; log, based on the anomaly and the associated risk, an incident record; determine, based on the anomaly, an approved change control exists; and execute the approved change control.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
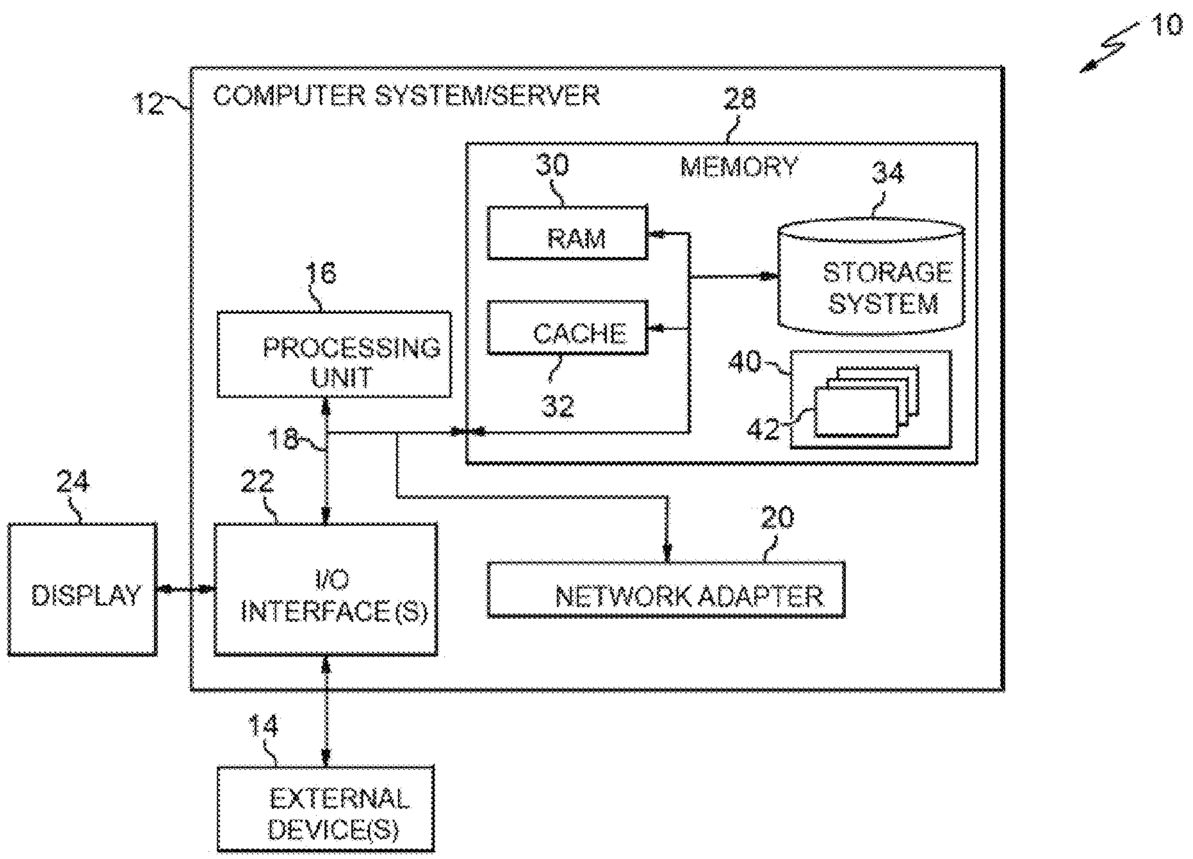
FIG. 1 depicts a cloud computing node according to an embodiment of the present invention.

Aspects of the present invention relate generally to managed information technology (IT) and operational technology (OT) systems (IT/OT systems) including systematic, computer-based pattern and anti-pattern recognition, risk analysis, and compliance validation in computer systems and, more particularly, to auditability, maintenance, and change management including performing pre-defined actions without user input to prevent non-compliance of systems. According to aspects of the present invention, a system, method, or computer program product may perform data capture regarding pattern and anti-pattern recognition within environment safety conditions, risk analysis of safety conditions, comparisons with predefined patterns and anti-patterns, and learning emerging patterns and anti-patterns based on feedback to trading systems. In embodiments, a system, method, or computer program product may perform compliance validation and assurance for Internet technology and other technology use cases and provide improved alerting, emergency recognition, critical response, and escalation for time-sensitive situations. In embodiments, a system, method, or computer program product may provide auditability, maintenance, and change management based on pattern and anti-pattern recognition. In this manner, implementations of the present invention receive real-world inputs such as audio, visual, or text data, identify and learn physical patterns observed within the real-world inputs, and perform predefined actions to prevent undesirable outcomes based on the recognized patterns. Additionally, implementations of the present invention identify new patterns observed within real-world inputs, which may be stored in a repository and correlated to predetermined risk mitigation action. Further, implementations of the present invention determine risk mitigation actions to systematically perform without user input. Implementations of the present invention also allow for user override or adjustment to patterns to ensure that risk mitigation actions are correct for a specific scenario.

In conventional systems, documenting compliance and proof of compliance to safety protocols across multiple industries may lack sufficient compliance data or the ability to report nonconformance in real time, leading to potentially catastrophic outcomes. Aspects of the present invention overcome shortcoming of conventional systems by transforming a set of inputs into a set of corresponding waveforms, generating a composite wave spectrum; and determining, based on a comparison to a pattern repository, an anomaly exists within the composite wave spectrum. In this way, aspects of the present invention overcome shortcomings in conventional systems by ensuring sufficient compliance data reporting in real time and taking automated, computer-implemented action when anomalies are detected. Aspects of the present invention overcome shortcomings in conventional systems by sectioning a composite wave spectrum into a waveform sub-set corresponding to a time interval of the composite wave spectrum and optimizing computing resource usage by comparing waveform sub-sets having an identified anomaly to known anomalies or known changes stored in an updated database. In this way, the analysis module may reduce the volume of waveforms that must undergo a matching process and, consequently, use fewer computing resources. In some embodiments, transforming the set of inputs into corresponding waveforms may include establishing subsections of the waveforms corresponding to time intervals within the waveform such that specific subsections of the waveform may be compared to the pattern repository to identify anomalies within the composite wave spectrum with reduced use of computing resources compared to analysis of entire waveforms.

In embodiments, a computer-implemented method, system, or computer program product may perform the steps of receiving a set of inputs; transforming the set of inputs into a set of corresponding waveforms, generating from the set of corresponding waveforms, a composite wave spectrum, in response to determining the composite wave spectrum is an operational-type spectrum, determining based on a comparison to a pattern repository, an anomaly exists within the composite wave spectrum, analyzing the anomaly to determine an associated risk, logging based on the anomaly and the associated risk, an incident record, determining in response to determining an emergency bypass does not apply, an approved change control exists, based on the anomaly, executing the approved change control, requesting in response to determining the composite wave spectrum includes an unclassified pattern, classification and risk assessment of the unclassified pattern, completing in response to receiving classification and risk assessment of the unclassified pattern, a set of mitigation actions, and generating an operational-type alert corresponding to a completed mitigation action.

Implementations of the present invention provide real-time generation of composite wave spectrums, comparison of the composite wave spectrums patterns within a pattern repository to identify anomalies, determining, in response to determining an emergency bypass does not apply, an approved change control exists, based on the anomaly, and executing the approved change control in IT/OT environments, and are therefore necessarily rooted in computer technology. For example, the steps of generating a composite wave spectrum, determining, based on a comparison to a pattern repository, an approved change control exists based on an anomaly within the composite spectrum, and automatically executing an approved change control in IT/OT environments based on the anomaly are computer-based and cannot be performed in the human mind. In particular, automatically executing an approved change control in IT/OT environments based on the anomaly identified in the composite wave spectrum requires no human input or interaction and cannot be performed in the human mind. These steps amount to more than merely implementing a generic computer as a tool to gather, analyze, and output data and would be impossible to accomplish on pen and paper or performed in the human mind. In particular, the speed at which the collecting and communication of data, including IT/OT data must be accomplished in order to effectuate the disclosed method, system, or computer program product, would be impossible to achieve on pen and paper, perform in the human mind, or be considered a method of organizing human activity. Similarly, the aforementioned steps amount to significantly more than merely a mathematical concept because they are implemented within specific IT/OT environments implementing purpose-specific computing devices and data repositories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
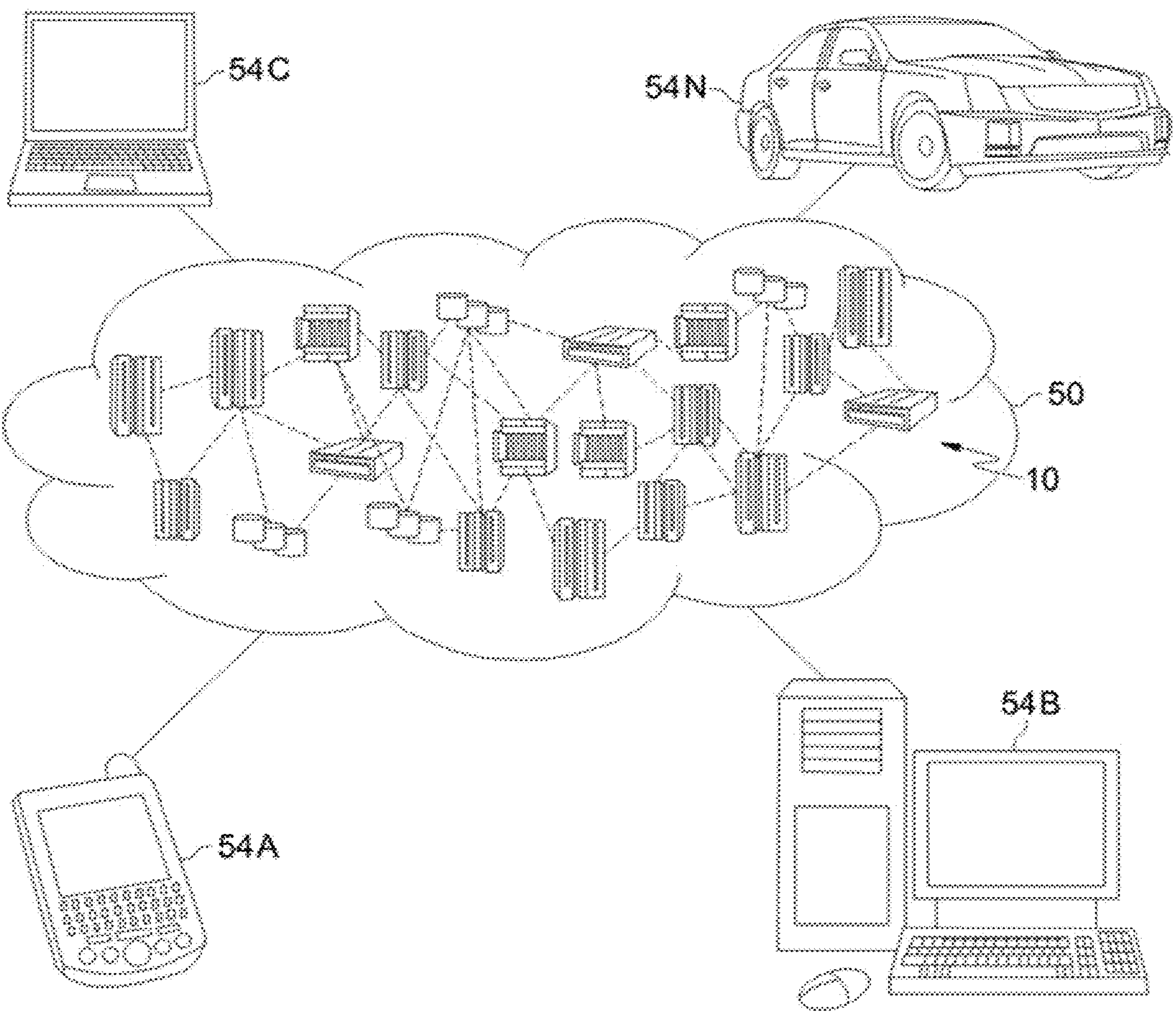
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
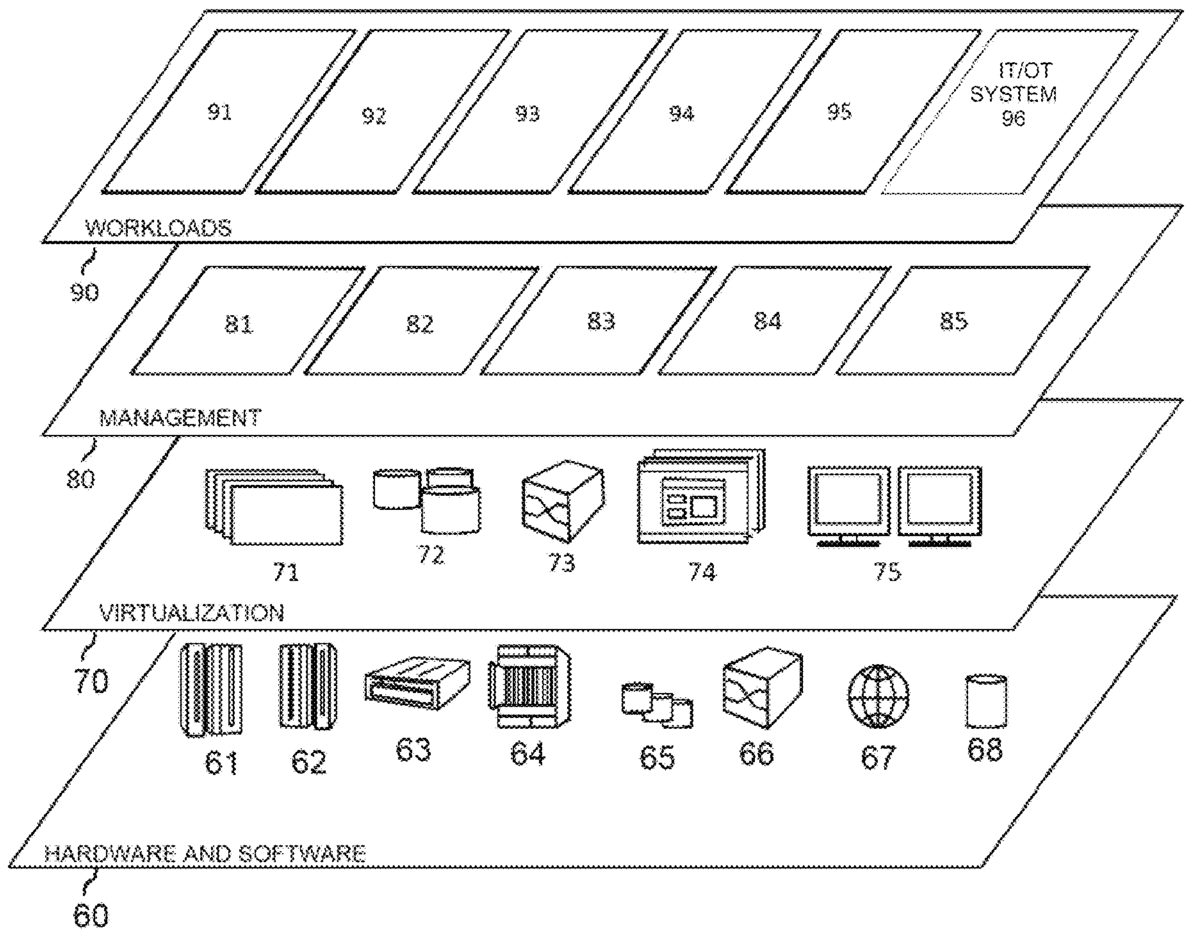
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IT/OT system 96.

Implementations of the invention may include a computer system/server 12 of FIG. 1 in which one or more of the program modules 42 are configured to perform (or cause the computer system/server 12 to perform) one of more functions of the IT/OT system 96 of FIG. 3. For example, the one or more of the program modules 42 of the IT/OT system 96 may be configured for: receiving a set of inputs; transforming the set of inputs into a set of corresponding waveforms; generating from the set of corresponding waveforms, a composite wave spectrum; in response to determining the composite wave spectrum is an operational-type spectrum, determining based on a comparison to a pattern repository, an anomaly exists within the composite wave spectrum; analyzing the anomaly to determine an associated risk; logging based on the anomaly and the associated risk, an incident record; determining in response to determining an emergency bypass does not apply, an approved change control exists, based on the anomaly; executing the approved change control; requesting in response to determining the composite wave spectrum includes an unclassified pattern, classification and risk assessment of the unclassified pattern; completing in response to receiving classification and risk assessment of the unclassified pattern, a set of mitigation actions; and generating an operational-type alert corresponding to a completed mitigation action.

Figure 4:
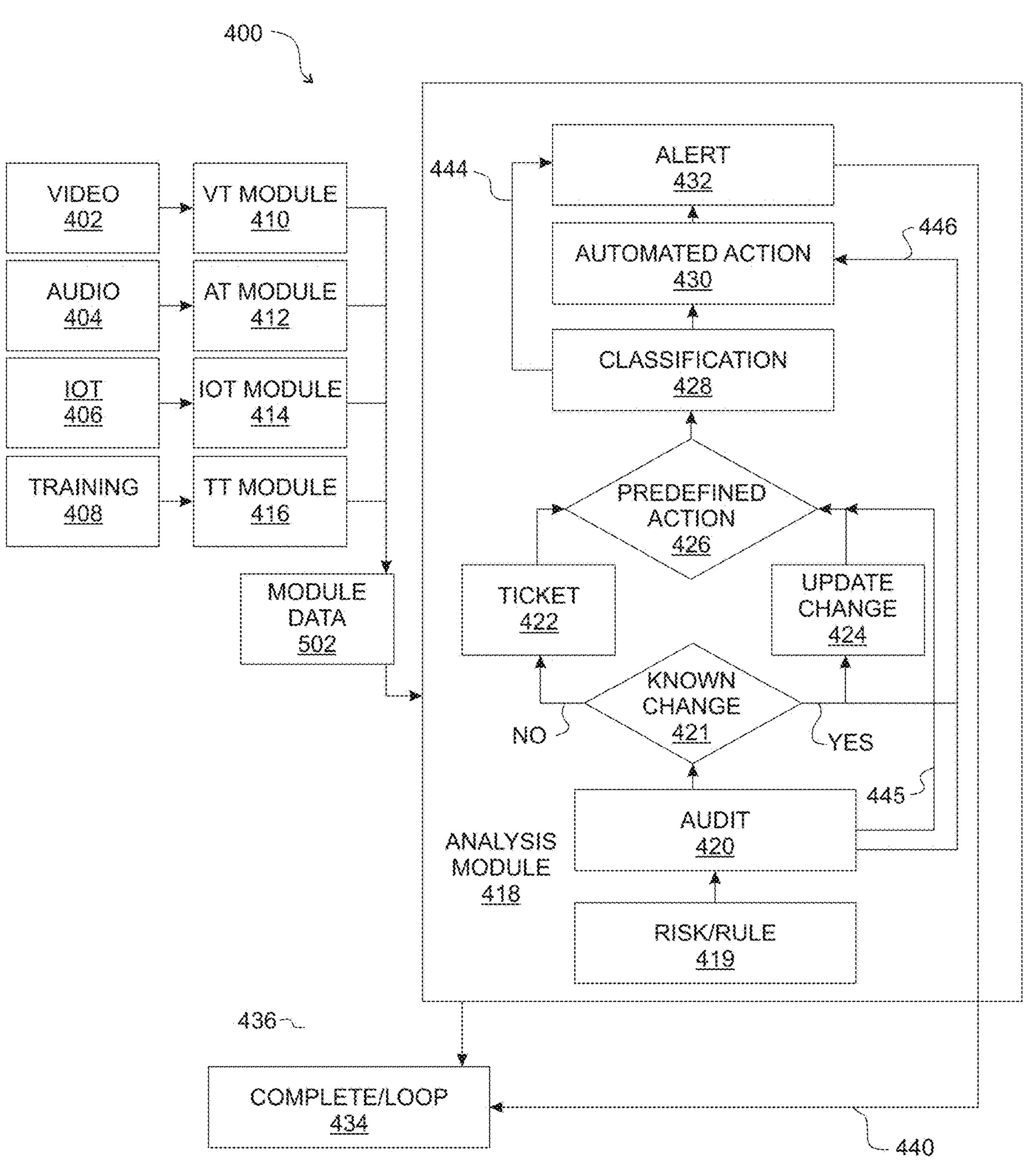
FIG. 4 shows a block diagram of an exemplary environment in accordance with aspects of the invention.

In embodiments, the IT/OT system 400 comprises video transformation (VT) module 410, an audio transformation (AT) module 412, an internet-of-things (IOT) module 414, and a training transformation (TT) module 416, each of which may comprise one or more program modules such as program modules 42 described with respect to FIG. 1. The IT/OT system 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows a block diagram of an exemplary environment in accordance with aspects of the invention. In embodiments, the environment includes an IT/OT system 400 corresponding to the IT/OT system 96 of FIG. 3.

Transforming sets of input data into a set of corresponding waveforms may include converting data into a format representable as a signal which may be processed as a waveform. This may include mapping data to x-axis and y-axis of a waveform. For example, the VT module 410 may capture time-sampled images from a video 402, pixelate the time-sampled images, and transform the pixels of the time-sampled images into a waveform. The VT module 410 may include mapping time data of the time-sampled images to an x-axis and pixels of the time-sampled images to a y-axis. In this way, VT module 410 may transform data into a corresponding waveform. Similarly, the AT module 412 may capture time-sampled audio 404 data from an audio stream or file and map time data of the time-sampled audio data to an x-axis and map sound samples, audio frequency spectrums, and/or "frames" of audio data to a y-axis. In this way, the AT module 412 transforms the data into a waveform. Additionally, the IOT module 414 may capture other time-sampled sensor data 406 (other than video or audio) and map time data of time-sampled IOT data to an x-axis and additional data to a y-axis. In this way, the IOT module 414 transforms the data into a waveform. In embodiments, the IOT module 414 may generate a frequency spectrum by voltage of the other time-sampled sensor data, which may be mapped to a y-axis. Waveforms from the VT module 410, AT module 412, IOT module 414, and TT module 416 may be processed to transform process waveforms in real-time to clean data, filter out noise, and organize data chronologically. Module data 502 may include the cleaned, filtered, and organized data from VT module 410, AT module 412, IOT module 414, and TT module 416. In embodiments, each of the VT module 410, AT module 412, IOT module 414, and TT module 416 may be configured to clean, filter, and organize data from respective data sources.

The analysis module 418 may receive processed waveforms from the TT module 416, the VT module 410, AT module 412, and IOT module 414. The analysis module 418 may also generate a composite wave spectrum by consolidating, such as by overlaying, each of the waveforms on one another. In particular, the analysis module 418 consolidates waveforms into a composite wave spectrum by overlaying the frequency spectrums of each waveform on a shared, time-based x-axis. The analysis module 418 may determine that the composite wave spectrum is an operational spectrum, i.e., the composite wave spectrum is in normal operational ranges for video, audio, and IoT data, by comparing the composite wave spectrum to a waveform associated with a common operation of an IT/OT system. In embodiments, the waveform may be included in a pattern repository. High overlap in the composite wave spectrum and the waveform associated with the common operation may indicate that the composite wave spectrum is an operational type. Similarly, the analysis module 418 may compare the composite wave spectrum to the waveform associated with the common operation to determine if an anomaly exists within the composite wave spectrum. The analysis module 418 may complete/loop 434 in response to an anomaly not being found 436. In embodiments, the complete/loop 434 waits for additionally processed waveforms from any of the VT module 410, AT module 412, IOT module 414, or TT module 416. The analysis module 418 may analyze the anomaly to determine an associated risk/rule 419. The associated risk/rule 419 may be a predefined value or rule assigned to or associated with a pre-identified anomaly that may include identified risks associated with a risk, e.g., low, medium, high, or an identified rule that executes computer-based logic for handling the identified anomaly. In embodiments, the associated risk/rule 419 may be stored in a database corresponding to storage system 34 of FIG. 1.

In response to determining an anomaly exists within the composite wave spectrum, the audit 420 may log an incident record based on the anomaly and the associated risk. Audit 420 may log the incident record in a database. In embodiments, in response to the incident record logged by the audit 420, the audit 420 may identify an emergency scenario that requires user override, prompting the audit 420 to perform an emergency bypass 445 of a change log and a predefined action 426. In some embodiments, in response to the incident record logged by the audit 420, the analysis module 418 may perform classification 428 of the anomaly by requesting an administrator to perform classification. In particular, a user, such as an administrator, may manually assign a classification 428 to the anomaly. In embodiments, classification 428 may include an alert 432 which prompts an administrator to complete the classification 428 or provide feedback. For example, the administrator may provide input instructing the IT/OT system 400 that the anomaly is associated with a known risk/rule 419 or a known change 421. In response to logging the incident record, the audit 420 determines if the known change 421, i.e., an approved change control including a predefined action 426, exists based on the anomaly by searching an approved change control database for approved change controls linked or associated with the incident record, the anomaly, or the associated risk. In response to identifying the known change 421, the audit 420 may perform an update change 424 by updating a change control ticket with information relating to correlating the anomaly to the known change 421. In this way, the audit 420 improves the accuracy of the system by modifying ticket 422 with relevant anomaly information and known change 421. Also, in response to identifying the known change 421, the audit 420 may automatically execute 446 the automated action 430 (i.e., perform the approved change control). In response to not identifying the approved change control (i.e., a known change 421), a ticket 422 may be generated for administrator review. In embodiments, the administrator may manually review ticket 422 and provide user input to perform a remedial action, such as predefined action 426. In embodiments, the administrator may select a predefined action 426 for the IT/OT system 400 to execute to resolve the anomaly and ticket 422. For example, predefined action 426 may include automatically quarantining a data set including an anomaly and adding information to ticket 422 indicating that the data set has been quarantined. Quarantining a data set may include isolating the data set from the rest of a system. In response to identifying the known change 421 and automatically executing the automated action 430, the audit 420 generates an alert 432 which notifies a user that the IT/OT system 400 has performed a complete/loop 434 regarding an identified anomaly.

Figure 5:
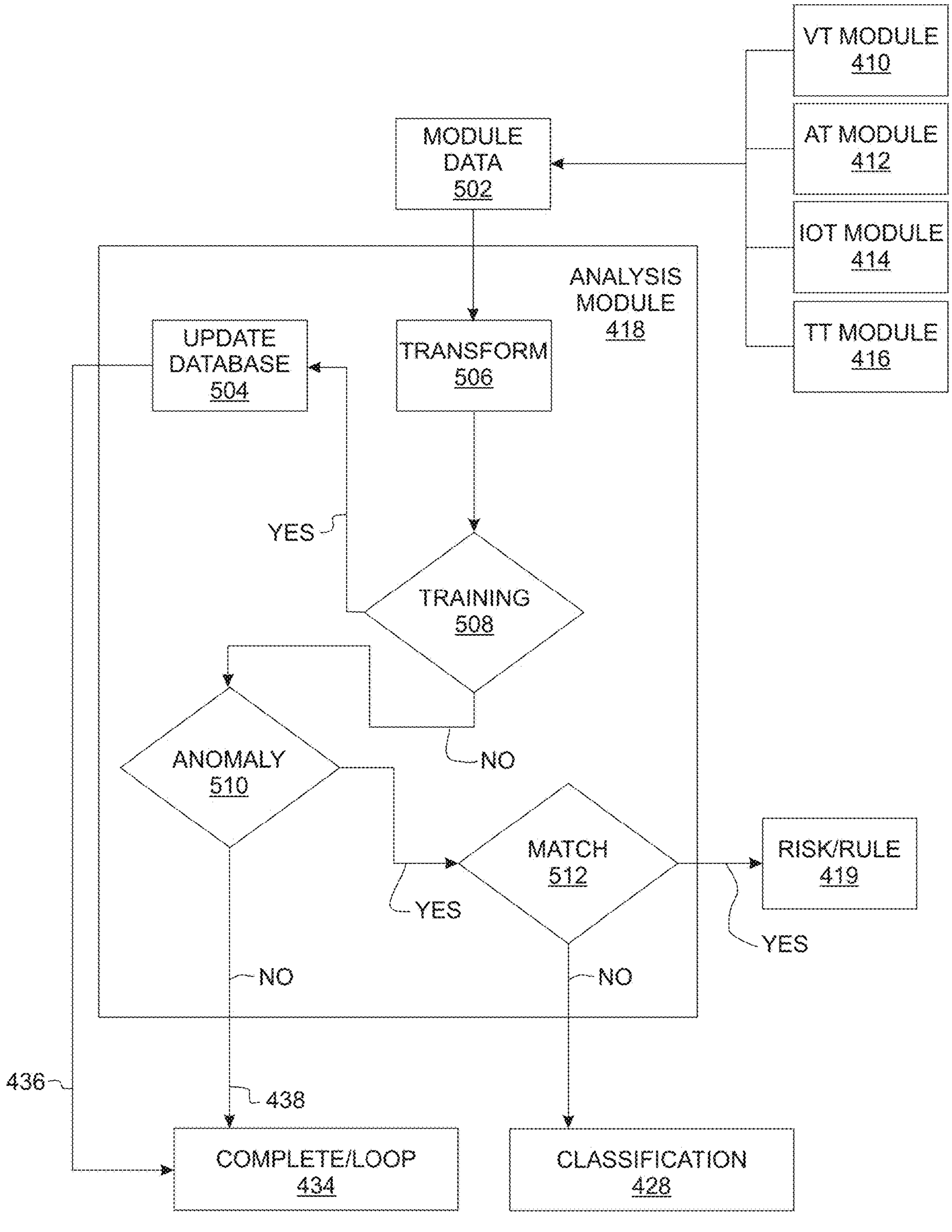
FIG. 5 shows a block diagram of an exemplary environment in accordance with aspects of the invention.

FIG. 5 shows a block diagram of an exemplary method in accordance with aspects of the present invention. Steps of the method may be carried out in the environment of FIG. 4 and are described with reference to elements depicted in FIG. 4.

The IT/OT system corresponds with the IT/OT system 400 of FIG. 4. In embodiments, and as described with respect to FIG. 4, the analysis module 418 may receive processed waveforms, in the form of module data 502, from the TT module 416 or, in some cases, unprocessed waveforms, in the form of module data 502, from each of the VT module 410, AT module 412, IOT module 414. The analysis module 418 may perform a transform 506 of a composite wave spectrum by consolidating each of the waveforms. In embodiments, transform 506 may include sectioning a composite wave spectrum into a waveform sub-set corresponding to a time interval of the composite wave spectrum. In this manner, the analysis module 418 may optimize computing resource usage by comparing waveform sub-sets having an identified anomaly 510 to known anomalies or known changes stored in the update database 504. The analysis module 418 may reduce the volume of waveforms that must undergo a match 512 process and, consequently, use fewer computing resources. The analysis module 418 may determine that the composite wave spectrum is a training 508 spectrum, e.g., composite wave spectrums containing training data for training the analysis module 418. The analysis module 418 may determine that the composite wave spectrum is an operational spectrum, i.e., the composite wave spectrum is in normal operational ranges for video, audio, and IoT data, by comparing the composite wave spectrum to a waveform associated with common operation of an IT/OT system. A waveform associated with common operation of an IT/OT system may be stored in a pattern repository, such as update database 504. In response to determining that the composite wave spectrum is a training 508 spectrum, the analysis module 418 may store the training 508 spectrum in an update database 504 as known anomalies or known changes. The training 508 spectrum may be used during the match 512 process, during which the IT/OT system compares identified anomalies 510 to known anomalies or known changes stored in update database 504. Anomalies that do not match 512 may undergo classification 428 of the anomaly by the administrator (as described above in FIG. 4) The analysis module 418 may complete/loop 434 in response to an anomaly 510 not being found. The analysis module 418 may analyze anomaly 510 to determine an associated risk/rule 419. The associated risk/rule 419 may be a predefined value associated with a pre-identified anomaly.

Figure 6:
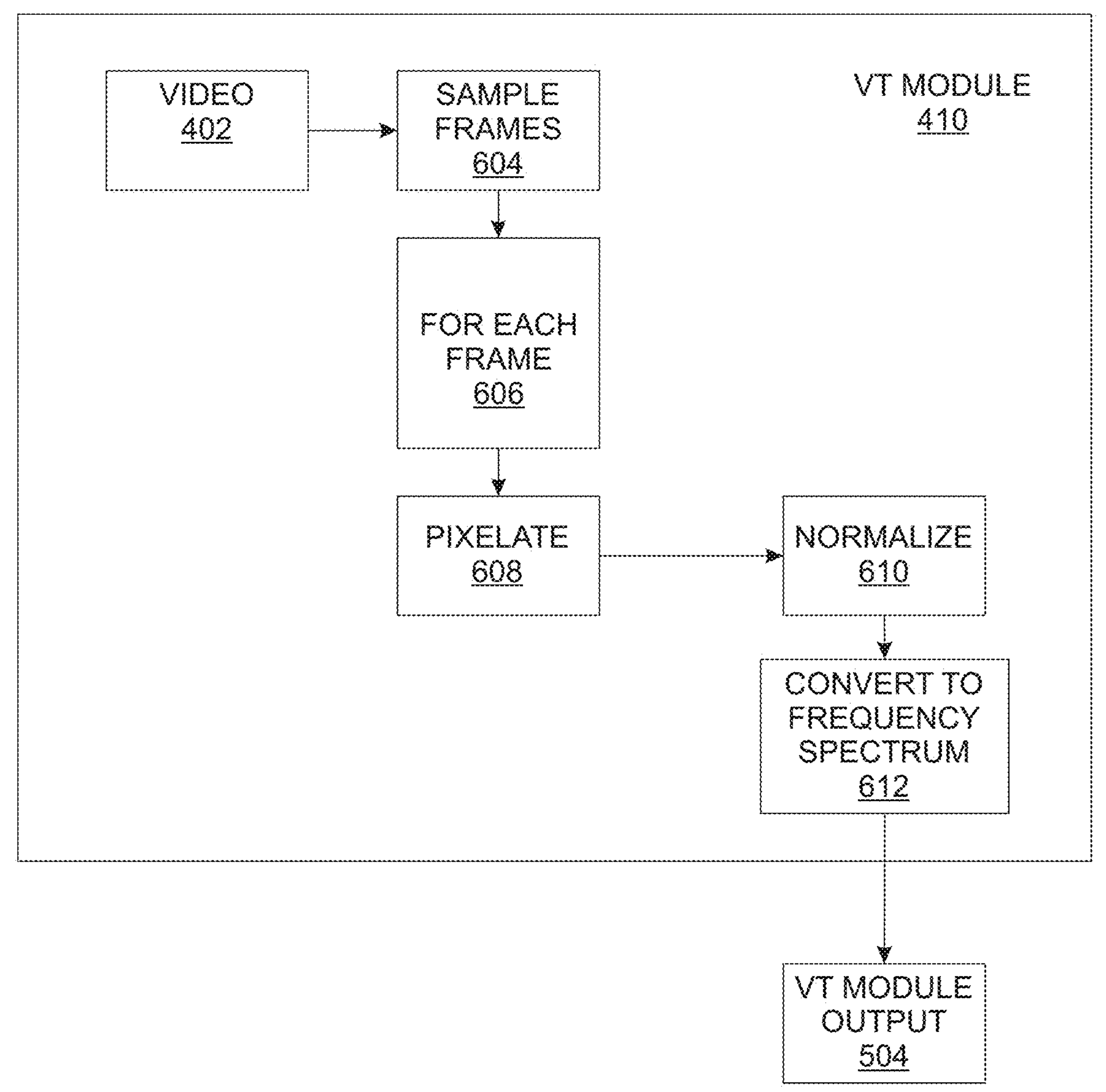
FIG. 6 shows a block diagram of an exemplary environment in accordance with aspects of the invention.

FIG. 6 shows a block diagram of an exemplary method in accordance with aspects of the present invention. The VT module 410 (as described in FIG. 4) may sample frames 604, such as capture time-sampled images, from a video 402. The VT module 410 may pixelate 608 the sample frames 604 for each frame 606 of video. The VT module 410 may normalize 610 the pixels of the samples frames 604. The VT module 410 may normalize 610 pixels and sample frames 604 via min-max normalization, z-score normalization, or the like and may include noise cancellation. The VT module 410 may convert the normalized 610 to a frequency spectrum 612, i.e., transformed into a waveform. The VT module 410 may map data to a waveform which includes mapping time data of the time-sampled images to an x-axis and pixels of the time-sampled images to a y-axis. The VT module 410 data may be transformed into a corresponding waveform as VT module output 504, corresponding to module data 502 of FIG. 5.

Figure 7:
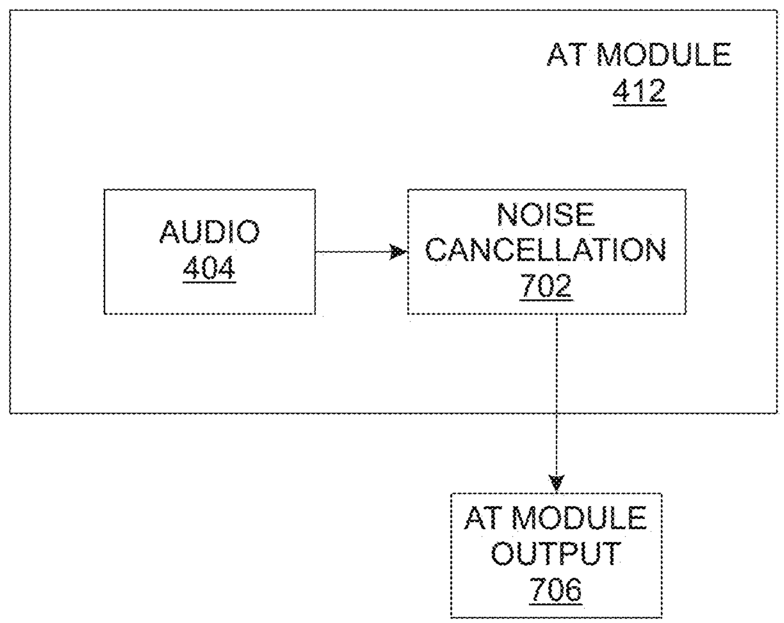
FIG. 7 shows a block diagram of an exemplary environment in accordance with aspects of the invention.

FIG. 7 shows a block diagram of an exemplary method in accordance with aspects of the present invention. The AT module 412 (as described in FIG. 4) may capture audio 404, such as time-sampled audio data, from an audio stream or file. The AT module 412 may perform noise cancellation 702 on the audio 404. The AT module 412 may map time data of the time-sampled audio data to an x-axis and sound samples, audio frequency spectrums, or "frames" of audio data to a y-axis, thereby transforming the data into an audio frequency spectrum, i.e., a waveform as AT module output 706, corresponding to module data 502 of FIG. 5.

Figure 8:
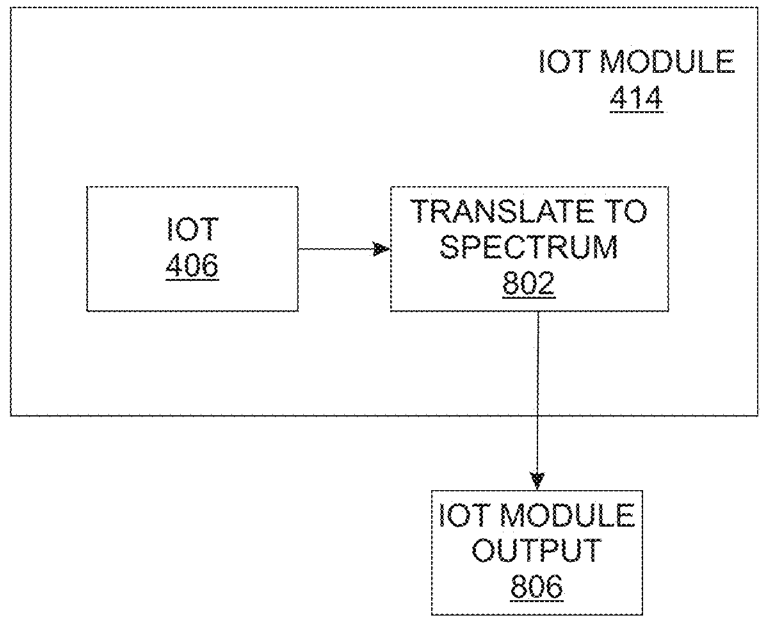
FIG. 8 shows a block diagram of an exemplary environment in accordance with aspects of the invention.

FIG. 8 shows a block diagram of an exemplary method in accordance with aspects of the present invention. The IOT module 414 (as described in FIG. 4) may capture IOT 406 data including time-sampled sensor data (other than video or audio) and map time data of time-sampled IOT data to an x-axis and additional data to a y-axis. In this way, the IOT module 414 transforms the data into a waveform, i.e., IOT module 414 translates IOT 406 data to spectrum 802. For example, the IOT module 414 may generate a frequency spectrum by voltage of the other time-sampled sensor data, which may be mapped to a y-axis while mapping time data of time-sampled IOT data to an x-axis. The IOT module 414 may generate IOT module output 806 corresponding to module data 502 of FIG. 5.

Figure 9:
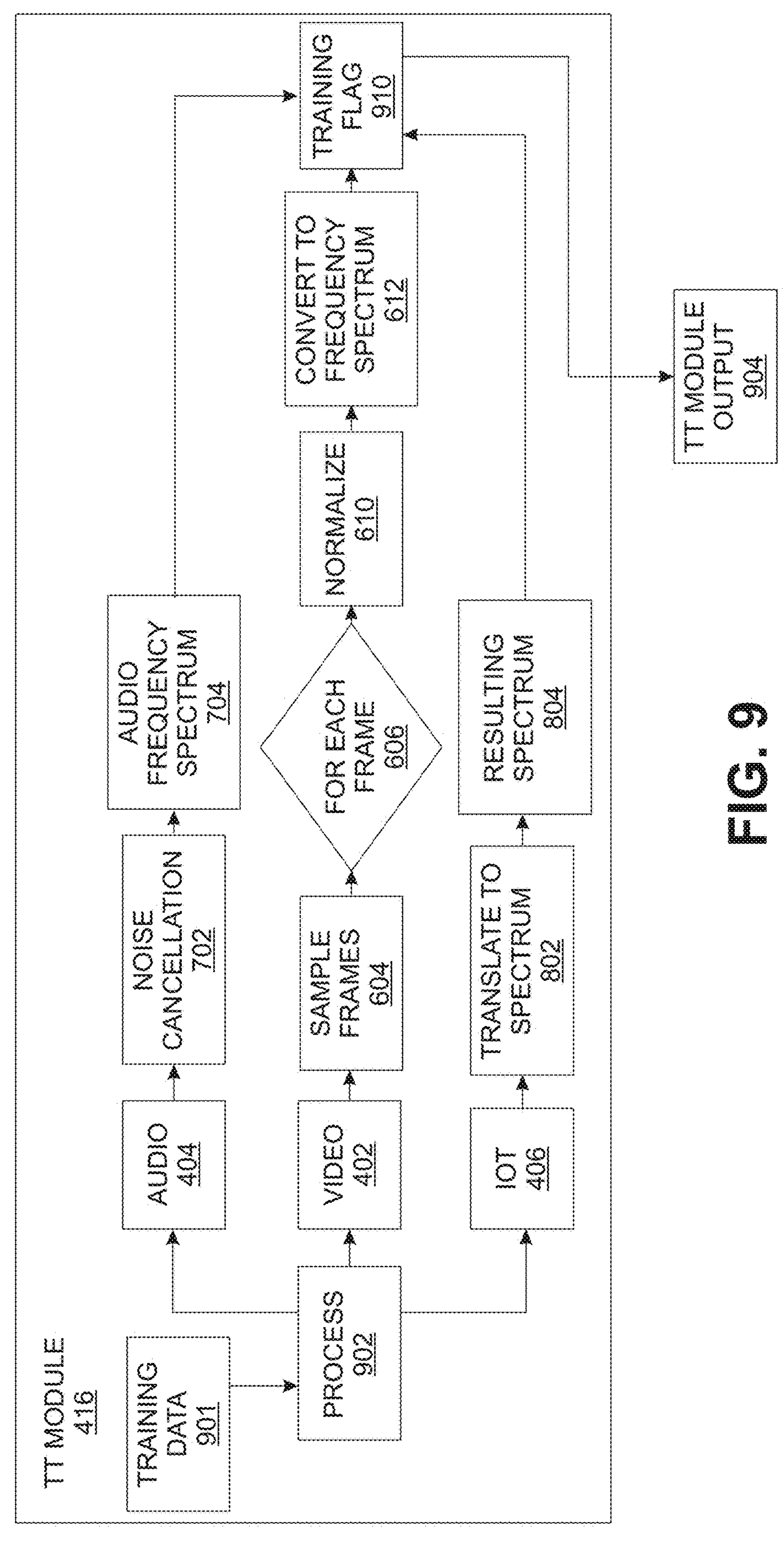
FIG. 9 shows a block diagram of an exemplary environment in accordance with aspects of the invention.

FIG. 9 shows a block diagram of an exemplary method in accordance with aspects of the present invention. The TT module 416 (as described in FIG. 4) may process 902 training data 901. In embodiments, the training data 901 also corresponds to module data 502 of FIGS. 4 and 5. In embodiments, TT module 416 performs each of the functions of the VT module 410, AT module 412, and IOT module 416 with respect to the training data 901. In particular, the TT module 416 (as described in FIG. 4) may sample frames 604, such as capture time-sampled images, from a video 402 and pixelate 608 the sample frames 604 for each frame 606 of video. TT module 416 may normalize 610 the pixels of the samples frames 604 and convert the pixels to frequency spectrum 612. The TT module 416 may capture audio 404, such as time-sampled audio data, from an audio stream or file and perform noise cancellation 702 on the audio 404 and convert to audio frequency spectrum 704. The TT module 416 may capture IOT 406 data including time-sampled sensor data and translate the time-sampled sensor data to spectrum 802 and a In step 1002, the IT/OT method may include receiving a set of inputs via the analysis module 418 of FIG. 4. In step 1004, the IT/OT method may include transforming the set of inputs into a set of corresponding waveforms via the analysis module 418 of FIG. 4. In step 1006, the IT/OT method may include generating from the set of corresponding waveforms a composite wave spectrum via the analysis module 418 of FIG. 4. In step 1008, the IT/OT method may, in response to determining that the composite wave spectrum is an operational-type spectrum, determine based on a comparison to a pattern repository, an anomaly exists within the composite wave spectrum via the resulting spectrum 804. Each of the frequency spectrum 612, audio frequency spectrum 704, and resulting spectrum 804 may be tagged with training flag 910, indicating that the spectrums are to be used as training data. For example, TT module output 904 may use training data, including pre-identified anomalies or known changes used during the match 512 process of FIG. 5, to compare identified anomalies 510 to known anomalies or known changes stored update database 504.

Figure 10:
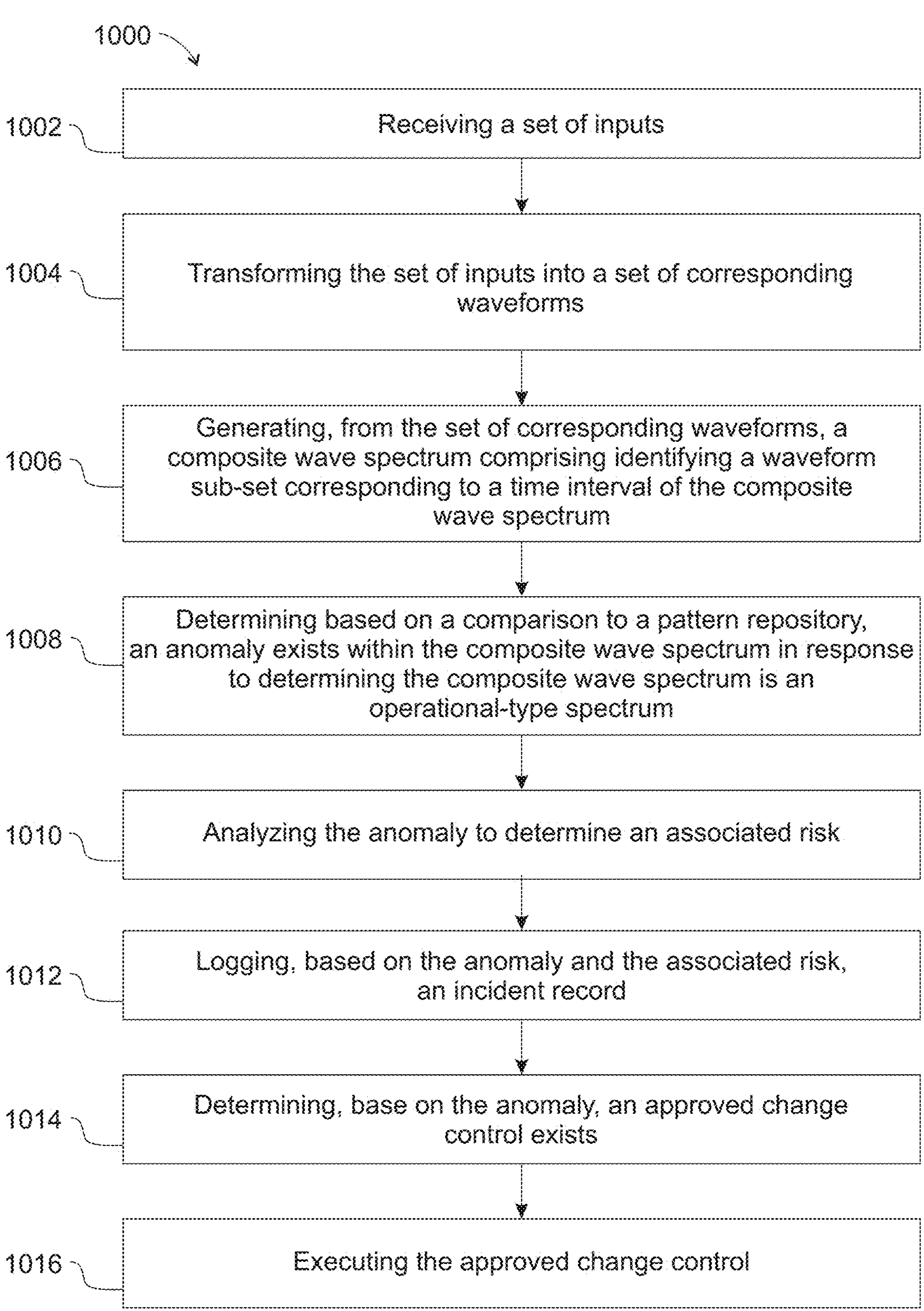
FIG. 10 shows a flowchart of an exemplary method in accordance with aspects of the invention.

FIG. 10 shows a flowchart of an exemplary method 1000 in accordance with aspects of the present invention. According to embodiments audit 420 of FIG. 4. In step 1010, the IT/OT method may include analyzing the anomaly to determine an associated risk via the audit 420 of FIG. 4. In step 1012, the IT/OT method may include logging based on the anomaly and the associated risk, an incident record via the audit 420 of FIG. 4. In step 1014, the IT/OT method may include determining based on the anomaly, an approved change control exists via the audit 420 of FIG. 4. In step 1016, the IT/OT method may include executing the approved change control via the audit 420 of FIG. 4.

In an embodiment, the disclosed IT/OT system 400 (as described in FIG. 4) may eliminate the exposure of risk of potential injury to individuals, such as engineers, in a lockout tagout scenario by tracking all data input and output activity of devices and machines in an engineering setting. For example, engineers may be working on equipment, and in order to comply with regulations relating to safety, the engineers must lock a machine out, making it nonfunctional when not in use. Each engineer working on the machine must block out the machine when not in use and apply a tag indicating why the machine is locked out. In some scenarios, locks may be unintentionally left on a machine during use resulting in stops or delays of production or operation for that machine. In order to stop the unintended lockout, a system may identify the engineer who placed the lockout incorrectly as required. In some cases, an individual may be inside the machine while it is locked out, resulting in a very high risk of potential injury if the machine were to be turned on wall locked out. The disclosed IT/OT system 400 may eliminate the exposure of risk of potential injury to individuals by monitoring lockout tag-out procedures, identifying anomalies within the procedures, identifying the risk associated with the anomalies, and automatically executing predefined actions (such as by flagging proper or improper lockout tag-out procedures) to prevent unintentional lockout or unintentional use of a machine.

In an embodiment, the disclosed IT/OT system 400 may eliminate exposure to potential injury to individuals in a compliance auditing scenario. For example, maintenance and operations of critical systems may require routine validation to confirm the proper use of personal protective equipment by individuals. The disclosed IT/OT system 400 facilitates the proper placement and planning of video monitoring checkpoints in a business operation and implements visual recognition patterns to identify individuals using personal protective equipment and individuals not using personal protective equipment. In this way, the disclosed IT/OT system 400 processes video data, identifies anomalies, identifies risks associated with the anomalies, and automatically executes predefined actions (such as generating an alert to a device indicating that personal protective equipment is not being used properly) to prevent improper use or non-use of personal protective equipment.

In an embodiment, the disclosed IT/OT system 400 may reduce or eliminate unauthorized activities in data center maintenance that may cause a production impact. For example, data center maintenance may require validation of users to ensure the person completing a change to the system is allowed to alter the system or execute changes to the data center. The disclosed IT/OT system 400 facilitates prevention of unauthorized changes monitoring patterns in change authorizations or user credentials to identify common change authorizations or anomalies within change authorizations, identify risks associated with the anomalies, and automatically execute predefined actions (such as automatically locking out unauthorized access to a data center by preventing network connection/communication with the data center) to prevent improper change authorizations in the data center.

In an embodiment, the disclosed IT/OT system 400 may reduce potential production impacts in a factory setting due to outages by identifying anomalies in production controls and alerting a user or prompting a user device to address the anomaly. For example, unauthorized access in controlled environments, such as production environments, can create challenges detrimental to the operations of critical systems. Unauthorized access or interference with critical systems may come from many sources, including people, animals, water, fire, smoke, gas, etc., and can create operational challenges within the production environment. Unauthorized access or interference may be identified via video, audio, or IoT sensors. The disclosed IT/OT system 400 facilitates the identification of anomalies in the form of unauthorized access or interference, identification of an associated risk, automatically executes predefined actions (such as automatically shutting down production equipment by powering the production equipment off), and automatically communicates an alert to a user or a user device of the anomaly.

In an embodiment, the disclosed IT/OT system 400 may provide for increased auditability of maintenance and operations by systematically recording evidence of change activities when executed. For example, auditability is an important feature of maintenance and operation systems to meet compliance and regulatory requirements. Operational procedures and maintenance operations subject to compliance requirements require recordation of maintenance operations that are both successful and unsuccessful, including corresponding data that satisfies compliance requirements indicating why an operation was successful or unsuccessful. The disclosed IT/OT system 400 facilitates the timely recordation of maintenance operations by monitoring video, audio, and IoT sensors for anomalies which may be recorded for the purposes of compliance. In this way, the disclosed IT/OT system 400 provides for improved operation compliance and auditability by automatically executing predefined actions (such as recording change activities and associated compliance information in a database).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a computing device, a set of inputs;

transforming, by the computing device, the set of inputs into a set of corresponding waveforms;

generating, by the computing device, from the set of corresponding waveforms, a composite wave spectrum comprising identifying a waveform sub-set corresponding to a time interval of the composite wave spectrum;

determining, by the computing device, based on a comparison of the waveform sub-set to a pattern repository, an anomaly exists within the waveform sub-set in response to determining the composite wave spectrum is an operational-type spectrum;

analyzing, by the computing device, the anomaly to determine an associated risk;

logging, by the computing device, based on the anomaly and the associated risk, an incident record;

determining, by a computing device, based on the anomaly, an approved change control exists; and executing, by the computing device, the approved change control, wherein the transforming the set of inputs into the set of corresponding waveforms comprises:

sampling frames from the set of inputs;

pixelating the sampled frames from the set of inputs; and converting the pixelated frames to a frequency spectrum.

2. The method of claim 1, further comprising:

updating, by a computing device, the pattern repository to include a pattern within the composite wave spectrum in response to determining the composite wave spectrum is a training type spectrum; and generating a training-type alert corresponding to the updated pattern repository.

3. The method of claim 1, further comprising:

executing a predefined action based on the associated risk in response to determining the emergency bypass applies, wherein the analyzing the anomaly to determine the associated risk automatically occurs in response to determining that the anomaly exists.

4. The method of claim 1, further comprising:

determining, by the computing device, no approved change control exists in response to determining the emergency bypass does not apply;

opening, based on the incident record, an update change control ticket;

executing a predefined action based on the associated risk; and tagging the frequency spectrum with a training flag.

5. The method of claim 4, wherein the predefined action comprises automatically locking out unauthorized access to a data center by preventing network communication with the data center.

6. The method of claim 1, further comprising:

completing, by the computing device, a set of predefined mitigation actions in response to determining the composite wave spectrum includes a classified pattern; and generating a classified pattern alert corresponding to the completed predefined mitigation actions.

7. The method of claim 1, wherein the determining an approved change control exists based on the anomaly occurs in response to not receiving a user-initiated emergency bypass.

8. The method of claim 1, further comprising:

generating, by the computing device, an operational-type alert corresponding to an executed approved change control.

9. The method of claim 1, further comprising:

requesting, by the computing device, user classification and risk assessment of the unclassified pattern in response to determining the composite wave spectrum includes an unclassified pattern;

receiving, by the computing device, user classification of the unclassified pattern;

creating, by the computing device, a newly classified pattern based on the received unclassified pattern; and storing, by the computing device, the newly classified pattern in the pattern repository.

10. The method of claim 9, further comprising:

completing, by the computing device, a set of mitigation actions in response to receiving classification and risk assessment of the unclassified pattern.

11. The method of claim 1, wherein the computing device includes software provided as a service in a cloud environment.

12. A computer program product comprising one or more computer readable storage media having program instructions collectively stored on the one or more computer readable storage media, the program instructions executable to:

receive a set of inputs;

transform the set of inputs into a set of corresponding waveforms;

generate from the set of corresponding waveforms, a composite wave spectrum comprising identifying a waveform sub-set corresponding to a time interval of the composite wave spectrum;

determine, based on a comparison of the waveform sub-set to a pattern repository, an anomaly exists within the waveform sub-set in response to determining the composite wave spectrum is an operational-type spectrum;

analyze the anomaly to determine an associated risk;

log, based on the anomaly and the associated risk, an incident record;

determine, based on the anomaly, an approved change control exists; and execute the approved change control, wherein the transforming the set of inputs into the set of corresponding waveforms comprises:

sampling frames from the set of inputs;

pixelating the sampled frames from the set of inputs; and converting the pixelated frames to a frequency spectrum.

13. The method of claim 12, wherein the program instructions are executable to:

update the pattern repository to include a pattern within the composite wave spectrum in response to determining the composite wave spectrum is a training type spectrum; and generate a training-type alert corresponding to the updated pattern repository.

14. The method of claim 12, wherein the program instructions are executable to:

execute a predefined action based on the associated risk in response to determining the emergency bypass applies, wherein the analyzing the anomaly to determine the associated risk automatically occurs to optimize computing resources in response to determining that the anomaly exists.

15. The method of claim 12, wherein the program instructions are executable to:

determine that no approved change control exists in response to determining the emergency bypass does not apply;

open, based on the incident record, an update change control ticket;

execute a predefined action based on the associated risk; and tag the frequency spectrum with a training flag.

16. The method of claim 12, further comprising:

complete a set of predefined mitigation actions in response to determining the composite wave spectrum includes a classified pattern; and generate a classified pattern alert corresponding to the completed predefined mitigation actions.

17. The method of claim 12, wherein the determining an approved change control exists based on the anomaly occurs in response to not receiving a user-initiated emergency bypass.

18. The method of claim 12, wherein the program instructions are executable to:

generate an operational-type alert corresponding to an executed approved change control.

19. The method of claim 12, wherein the program instructions are executable to:

request user classification and risk assessment of the unclassified pattern in response to determining the composite wave spectrum includes an unclassified pattern;

receive user classification of the unclassified pattern;

create a newly classified pattern based on the received unclassified pattern; and store a newly classified pattern in the pattern repository.

20. A system comprising:

a processor, a computer readable memory, one or more computer readable storage media, and program instructions collectively stored on the one or more computer readable storage media, the program instructions executable to:

receive a set of inputs;

transform the set of inputs into a set of corresponding waveforms;

generate from the set of corresponding waveforms, a composite wave spectrum comprising identifying a waveform sub-set corresponding to a time interval of the composite wave spectrum;

determine, based on a comparison of the waveform sub-set to a pattern repository, an anomaly exists within the waveform sub-set in response to determining the composite wave spectrum is an operational-type spectrum;

analyze the anomaly to determine an associated risk;

log, based on the anomaly and the associated risk, an incident record;

determine, based on the anomaly, an approved change control exists; and execute the approved change control, wherein the transforming the set of inputs into the set of corresponding waveforms comprises:

sampling frames from the set of inputs;

pixelating the sampled frames from the set of inputs;

converting the pixelated frames to a frequency spectrum; and tagging the frequency spectrum with a training flag.

* * * * *